United States Patent Office 2,867,781
Patented Jan. 6, 1959

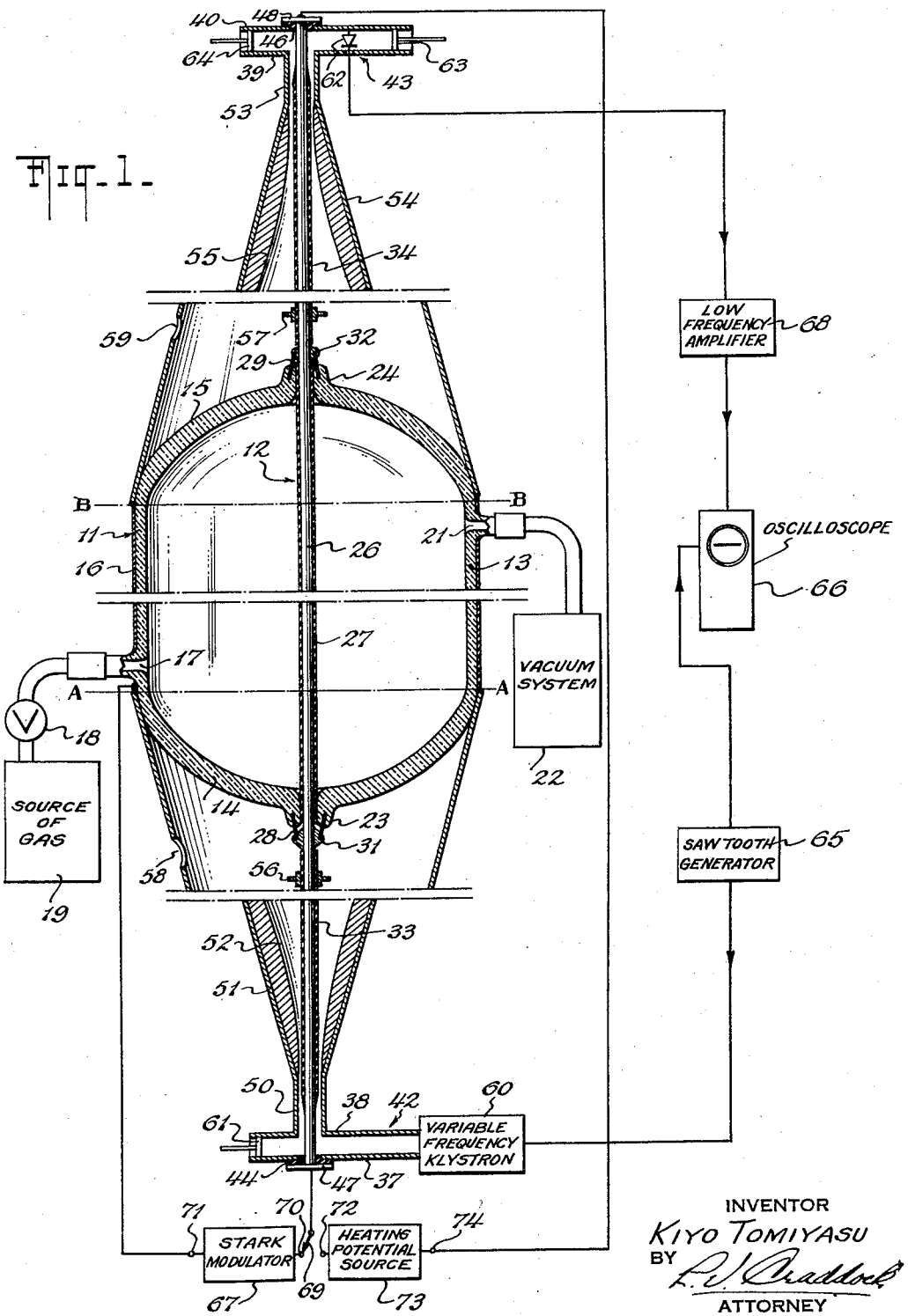

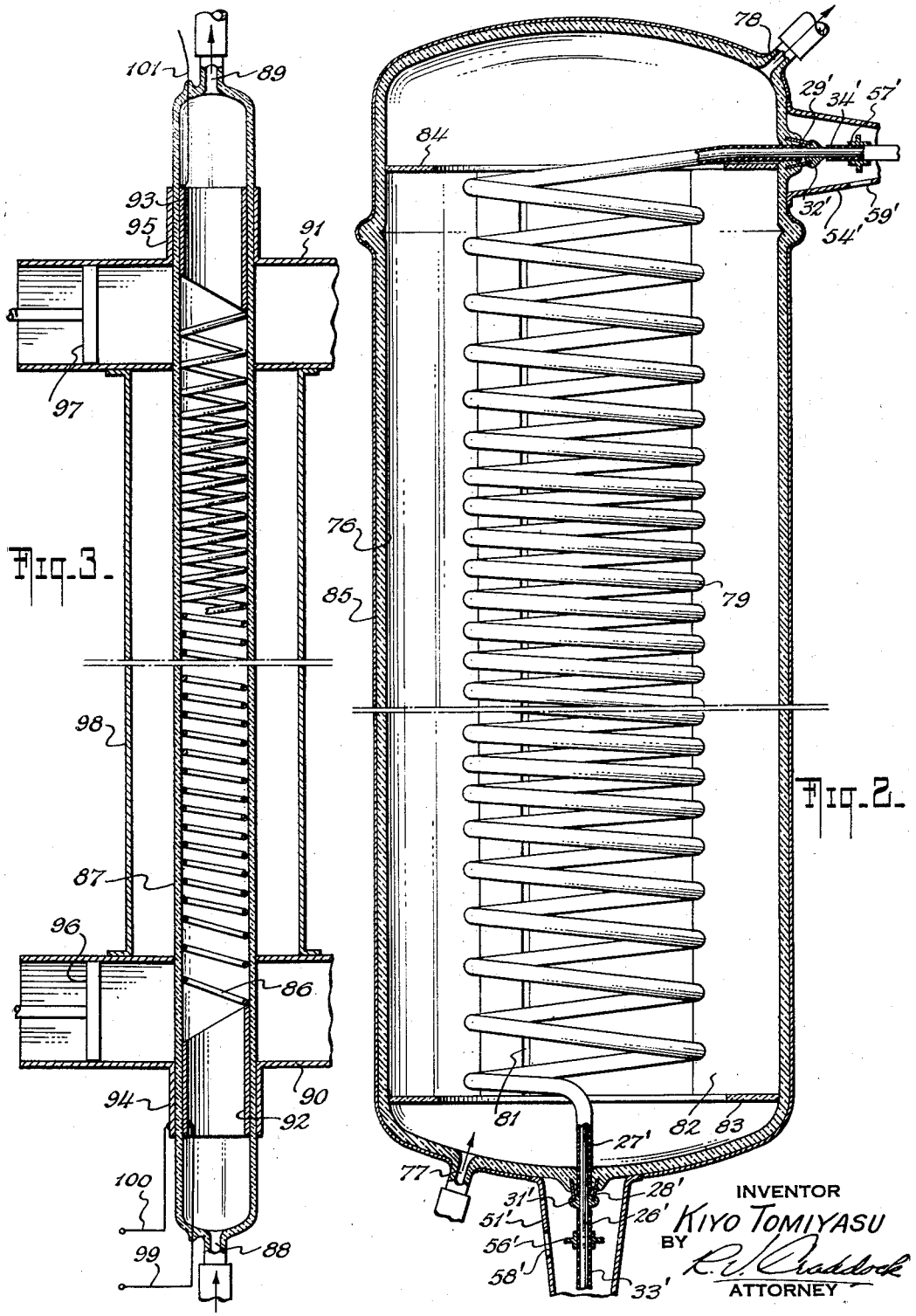

2,867,781

MICROWAVE SPECTROMETER ABSORPTION CELLS

Kiyo Tomiyasu, Flushing, N. Y., assignor to Sperry Rand Corporation, a corporation of Delaware Application November 26, 1954, Serial No. 471,203

12 Claims. (Cl. 333—73)

The present invention relates to microwave spectrometer absorption cells.

The molecular structure of many gases can be studied by transmitting electromagnetic waves of predetermined frequencies through a cell containing a gas to be analyzed and detecting the reduction in the intensity of the electromagnetic waves at discrete frequencies after passage therethrough. The extent of microwave absorption by a gas at a particular frequency is designated as an absorption line. Each of many different gases has a unique set of absorption lines differing from that of any other gas, the absorption lines being invariant to external factors such as time, pressure and temperature.

A widely used absorption cell utilized in microwave spectrometer systems is comprised of a hollow rectangular wave guide of metal designed to contain a gas to be tested at a reduced pressure. Often a thin, flat Stark electrode is insulatedly supported by dielectric means within such a wave guide parallel to the broad walls thereof for increasing the sensitivity of the spectrometer system by establishing a Stark modulating electric field between the aforementioned electrode and the broad wave guide walls. A cell as aforedescribed is disadvantageous since all of the inner metallic surfaces thereof are exposed to the gas in the cell and subject to gas contamination. Furthermore, the Stark electrode within the hollow wave guide increases the attenuation for microwaves transmitted through the cell, especially at frequencies above 30 kilomegacycles.

If it is desired to selectively test several different gases during a short period of time, gas contamination of metal surfaces of an absorption cell impairs the operation of a spectrometer system since absorption lines for a previously tested as well as a subsequent gas may be detected. Thus, an accurate picture of the absorption line spectrum of the subsequent gas cannot be readily ascertained unless the cell is continuously evacuated or pumped for an extensive period of time to rid it of a previously tested gas.

It is an object of the present invention to provide an improved microwave absorption cell for use in a microwave spectrometer system for testing the absorption properties of certain fluids.

It is a further object of the present invention to provide a microwave absorption cell as aforedescribed wherein contamination of the cell with gaseous fluids to be tested is minimized.

Yet another object of the present invention is to provide a microwave absorption cell as aforedescribed which includes provisions for Stark modulation of a gas therein without inhibiting the microwave transmission efficiency of the device nor restricting the upper frequency range at which it may be operated.

Still another object of the present invention is to provide a microwave absorption cell as aforedescribed whose physical length is minimized.

The foregoing and other objects of the present invention are attained by providing a microwave absorption cell comprising container means adapted to confine a fluid whose microwave absorptive characteristics are to be determined. A uni-conductor transmission line section is provided within the container means for guiding microwave energy therethrough along the outer surface of the uni-conductor at a reduced phase velocity along the axis of a tubular container wall which is less than the velocity of light.

The provisions of the uni-conductor transmission line section for guiding microwave energy at a reduced phase velocity nullifies any requirement for an outer conductor for confining the electromagnetic fields of the microwave energy within the container means. Therefore, the container means may be composed of dielectric material and the microwave absorptive properties of gaseous fluids may be readily analyzed without fear of false absorption line responses due to contamination of the container means by a previous gas therein.

Stark modulation of the gas in an absorption cell as aforedescribed can be readily effected by applying a Stark voltage between the uni-conductor transmission line section and metallic shielding means provided about the cell. If the metallic shielding means is spaced a sufficient distance from the uni-conductor transmission line section so as to have no appreciable effect on the electromagnetic field thereabout over a desired operating frequency range, the microwave transmission efficiency of the transmission line section is substantially independent of the Stark modulation arrangement.

Referring to the drawings,

Fig. 1 is a schematic illustration of a microwave spectrometer system including a sectional view of an absorption cell in accordance with a first embodiment of the present invention;

Fig. 2 is a sectional view of a microwave absorption cell in accordance with a further embodiment of the present invention; and Fig. 3 is a sectional view of yet another embodiment of a microwave absorption cell in accordance with the present invention.

Referring to Fig. 1, a microwave spectrometer system is shown which includes an absorption cell comprising a container 11 which supports a section of uni-conductor microwave transmission line 12 therein. The container 11 is adapted to confine a fluid such as a gas whose microwave absorptive properties are to be analyzed for interaction with electromagnetic waves guided through container 11 by transmission line 12.

The container 11 is composed of a dielectric material having low microwave absorption and low gas contamination properties such as glass. Container 11 may be of integral construction, being shaped so as to have an intermediate cylindrical section 13 and hemispherical end sections 14 and 15. The length of container 11 should be of the order of ten feet or more, the diameter of cylindrical section 13 being chosen so that the electromagnetic field about the section of transmission line 12 therewithin is enveloped by section 13. The outer surface of the cylindrical section 13 is coated with a layer 16 of metal such as silver for shielding purposes and for providing an electrode for Stark modulation of the gas within container 13 as will be described further along herein.

A gas inlet means comprising an aperture 17 is provided at one region through the cylindrical section 13 near one end of container 11 for coupling the interior of the container through a valve 18 to a suitable source 19 of the gas to be analyzed. An aperture 21 is provided at another region through the section 13, near the other end of container 11 for coupling the interior of the container 11 to a suitable vacuum system 22.

Coaxial apertured protuberances 23 and 24 are provided at the centers of the end sections 14 and 15, respectively, of container 11 so that an elongated conductor 26 of transmission line 12 can be inserted through the container 11 in coaxial relationship therewith. The diameters of the aperture through protuberances 23 and 24 are large enough so that a section of conductor 26, which is covered with a thin layer of dielectric material 27, can be readily inserted within the container 11 as illustrated in Fig. 1.

Conical metallic members 28 and 29 are sealed to the ends of protuberances 23 and 24, respectively, for vacuum sealing the container 11 to the conductor 26. Fillets 31 and 32 of soft solder are utilized for sealing the members 28 and 29, respectively, to conductor 26.

After the section of conductor 26 which includes the dielectric layer 27 is vacuum sealed within the container 11, dielectric layers 33 and 34 are provided about further sections of conductor 26 external to container 11 in adjacent relationship with fillets 31 and 32, respectively. Dielectric layers 27, 33 and 34 are of low microwave loss material such as "polyethylene," and are provided about conductor 26 for reducing the phase velocity of electromagnetic waves therealong. Microwave energy is efficiently guided by the dielectric coated conductor 26 without the need of an outer conductor as is the case through the cylindrical section 13 of container 11 in accordance with principles known in the art and set forth in U. S. Patent No. 2,685,068, published July 27, 1954. Such a conductor is known as a surface wave transmission line.

The dielectric layers 27, 33 and 34 are of the same thickness, the thickness being chosen so that over the range of frequencies of the microwave energy to be guided through container 11 the radial extent the electromagnetic field within container 11 will be less than the radius of the inner wall of cylindrical section 13. By way of example for guiding microwave energy at frequencies above 20 kilomegacycles, the diameter of a conductor 26 of copper may be of the order of 0.1 inch with the thickness of dielectric layers 27, 33 and 34 of "polyethylene" being of the order of 0.005 inch. In such an example the cylindrical wall section 13 has an inner diameter of approximately three inches. A minimum desirable inner diameter for section 13 would be of the order of three wavelengths at the lowest operating frequency of microwave energy desired to be guided by transmission line 12.

Two rectangular wave guides 42 and 43 are supported in transverse relationship to the conductor 26 at opposite ends thereof. Wave guides 42 and 43 are arranged so that opposite end sections of conductor 26 pass through coaxial central apertures through broad walls 37—40 of wave guides 42 and 43. The ends of conductor 26 are insulated from the wave guides 42 and 43 by dielectric washers 44 and 46 in walls 37 and 40, respectively.

Washers 44 and 46 have enlarged diameter portions so as to extend radially outward from conductor 26 along the outer surfaces of the wave guide walls 37 and 40. Metallic caps 47 and 48, which are threaded upon the ends of conductor 26 to abut the washers 44 and 46, respectively, have diameters conformal with the aforementioned enlarged diameter portions of washers 44 and 46. The diameters of caps 47 and 48 are properly chosen so that the conductor 26 is effectively short circuited for microwave energy to the inner portions of wave guide walls 37 and 40 respectively.

A cylindrical metallic portion 50 is coupled to the wave guide 42 at the aperture in the broad wall 38 thereof so as to open into wave guide 42, portion 50 being coaxial with the elongated conductor 26. The dielectric layer 33 upon conductor 26 is terminated at a region within the cylindrical portion 50.

A conical horn section 51, whose smaller end has an inner diameter conformal with the inner diameter of conductor portion 50, is joined at its smaller end to the end of portion 50 most remote from wave guide 42. Section 51 extends along conductor 26 in coaxial relationship therewith for many wavelengths at the microwave frequencies at which the device is to be operated. The larger end of horn section 51 is cemented, for example, to an external wall portion of container 11 adjacent the end of cylindrical section 13.

The inner wall of horn section 51 is provided with a tubular section 52 whose outer surface is conformal with and abuts the inner surface of horn section 51. Section 52 extends from the smaller end of horn section 51 for approximately one half the length of the horn section. The inner surface of section 52 is smoothly curved so that this section and the remaining portion of horn section 51 therebeyond effect a gradual change in impedance from the section of coaxial line comprising conductor portion 50 and conductor 26 to the section of transmission line 12 between lines A—A and B—B in Fig. 1.

A cylindrical metallic portion 53, a horn section 54 and a matching section 55, which are similar to elements 50–52, respectively, are also provided for coupling the wave guide 43 to the section of transmission line 12 between lines B—B and A—A in Fig. 1 with a minimum of impedance mismatch.

The dielectric end sections 14 and 15 of container 11 should be one half wavelength in thickness at the midband frequency of operation of microwave energy within these sections for minimizing reflections therefrom. Thin metallic disc members 56 and 57 having emperically determined diameters are provided at appropriate locations along the transmission line conductor 26 about the surfaces of the dielectric coatings 33 and 34, respectively, for cancelling any reflections from the container end sections 14 and 15 and the structure utilized to vacuum seal these sections to conductor 26. The disc members 56 and 57 are adjustable along conductor 27, and are preferably supported by resilient means exerting pressure against coatings 33 and 34 so as to remain fixed in place when not being adjusted. Apertures 58 and 59 are provided through the walls of horns 51 and 54, respectively, so that a probe can be inserted therethrough to adjust members 56 and 57.

The wave guide 42 comprises an input wave guide for the system and is coupled to a source 60 of variable frequency microwave energy such as a reflux klystron. If the spectrometer system is desired to be operated over a frequency range of 22–25 kilomegacycles, for example, a 2K33 reflux klystron would be suitable. An adjustable plunger 61 is provided at the end of wave guide 42 on the other side of conductor 26 from source 60 for insuring that optimum coupling is provided between wave guide 42 and the conductor 26 of transmission line 12.

The wave guide 43 comprises an output wave guide for the system which receives microwave energy after its passage via transmission line 12 through container 11. A crystal square-law detector 62 is provided at a suitable point near one end of the output wave guide 43 for detecting the magnitude of the microwave energy therein, an adjustable tuning plunger 63 being provided at the aforesaid one end of wave guide 43 for insuring an optimum transfer of energy to detector 62. An adjustable tuning plunger 64 is also provided at the other end of wave guide 43 for insuring an optimum transfer of energy from conductor 26 of transmission line 12 to wave guide 43. The wave guides 42 and 43 should be excited in their dominant TE modes wherein the transverse electric vectors of the electromagnetic waves therein are perpendicular to the broad wave guide walls.

A slow-sweep sawtooth wave generator 65 is coupled to the reflector electrode of klystron 60 for slowly sweeping the frequency thereof over a predetermined range. The generator 65 also supplies a sawtooth wave to one of the horizontal deflecting plates of an oscilloscope 66, the other horizontal deflecting plate being grounded. The horizontal trace on the oscilloscope screen should be synchronized with the sweep voltage supplied to the reflector electrode of klystron 60 by generator 65.

A modulator 67 of zero-based square wave voltage at a frequency of four kilocycles or eighty to one hundred kilocycles per second, for example, is provided in the system for Stark modulation purposes. A switch 69 couples one output terminal 70 of the modulator 67 to the conductor 26 of transmission line 12, the other output terminal 71 of modulator 67 being coupled to the metallic coating 16 about the cylindrical section 13 of container 11.

A low frequency amplifier 68 tuned to the repetition rate of the modulator 67 is coupled to the output of the crystal rectifier 62. The output of amplifier 68 is supplied to one of the vertical deflecting plates of oscilloscope 66, the other vertical deflecting plate being grounded.

The components 65—68 of the system shown in Fig. 1 are conventional to microwave spectrometer systems known in the art so need no detailed description herein. To operate the system as a spectrometer, the container 11 is evacuated by the vacuum system 22 to a pressure of approximately $10^{-6}$ mm. Hg, valve 18 being closed. After evacuation of the container to a suitable pressure, the valve 18 is opened for permitting a gas to be tested to enter container 11 until it reaches a pressure of $10^{-5}$ mm. Hg, for example.

The switch 69 is then closed to connect output terminal 70 of the modulator 67 to conductor 26 for Stark modulation of the gas in container 11 by developing a Stark electric field between the portion of conductor 26 within cylindrical section 13 of container 11 and the metallic coating 16 upon section 13. The amount of Stark modulating voltage for best detection should be determined empirically, it being desirable to be able to vary the amplitude of the Stark voltage from zero to 1,000 volts.

In the search for gas absorption lines the klystron source 60 is adjusted manually for operation at a predetermined mid-band frequency. If the source comprises a 2K33 klystron, for example, the mid-band frequency will be somewhere between 22–25 kilomegacycles, the klystron reflector voltage being adjusted for maximum oscillations in a desired reflector voltage operating mode. The plungers 61 and 64 in wave guides 42 and 43, respectively, should be adjusted for maximum coupling at this frequency between the transmission line 12 and the wave guides 42 and 43. Likewise, the plunger 63 should be adjusted for a maximum transfer of microwave energy to crystal detector 62. The position of reflection cancelling members 56 and 57 upon the transmission line 12 should also be adjusted for minimizing standing waves therealong at the aforementioned frequency.

The sawtooth wave from generator 65 is then supplied to the reflector electrode of klystron 60 for periodically sweeping the reflector voltage between approximately the half power points of the aforementioned reflector voltage mode, thus frequency modulating the klystron 60 over a range from below to above the aforementioned predetermined mid-band frequency. The frequency modulated microwave output energy is transmitted down wave guide 42, along transmission line 12 for interaction with the gas in container 11, and down wave guide 43 to the crystal detector 62.

Stark modulation of the gas within the container 11 by the electric field between conductor 26 and the cylindrical metallic coating 16 established by the square wave voltage derived from the Stark modulator 67 has the effect of shifting the Stark components of the main absorption lines of the gas within container 11 to frequencies displaced on both sides of the main absorption line frequencies. Thus, if the range over which the klystron 60 is frequency modulated includes a main absorption line frequency of the gas being tested within container 11, for example, a certain amount of microwave energy is absorbed by the gas at this frequency during the time intervals between the square-wave portions of the modulating voltage when the Stark voltage is of zero magnitude. A lesser amount of microwave energy is absorbed at such a frequency during the aforementioned square-wave portions of the modulating voltage since during these later time intervals the Stark components of the gas absorption line are shifted in frequency.

The foregoing differential absorption of the microwaves at a main absorption line frequency results in amplitude modulation of the microwave energy, the modulating frequency corresponding to the repetition frequency of the square wave modulating voltage from modulator 67. The amplitude modulated microwave energy which appears at the crystal detector 62 when the microwave frequency is at an absorption line frequency is demodulated and amplified by the low frequency amplifier 68. The output from amplifier 68 is supplied to the vertical deflecting plates of oscilloscope 66 so that a vertical trace will appear on its screen which intersects the horizontal trace therealong at a point corresponding to the absorption line frequency.

If a frequency in the frequency modulated range of frequencies of klystron 60 corresponds to a main absorption line frequency of the gas in container 11 as aforedescribed, a vertical trace will also appear on the screen of oscilloscope for at least one frequency corresponding to a displaced Stark component of the main absorption line. This occurs since microwave energy at a frequency corresponding to a displaced Stark component of an absorption line is also intensity modulated. Microwave energy at other frequencies which do not correspond to either the frequency of the main absorption line or the frequencies of the displaced Stark components thereof will not be absorbed. Thus, there is no amplitude modulation of the microwave energy at these other frequencies and there will be no vertical deflection of the oscilloscope beam thereat.

The microwave absorption line pattern for the gas in container 11 may be studied over the entire frequency range of 22–25 kilomegacycles, for example, by manual adjustment of the klystron 60 for oscillation at different mid-band frequencies and repeating the foregoing procedure. The foregoing manual adjustment involves changing the frequency of reasonance of the resonator of klystron 60 and changing the steady state value of reflector voltage therefor, as is known in the art. Each time the mid-band frequency of klystron 60 is changed manually as aforedescribed the positions of plungers 61, 63, 64 and the reflection cancelling members 56 and 57 should be changed for maximum transfer of microwave power to crystal detector 62 with a minimum of standing waves along the microwave transmission line system.

After analyzing the microwave absorptive properties of one gas within container 11, the container should be evacuated of the gas. Since the walls of container 11 are of dielectric material having low gas contamination properties, traces of the gas may be readily removed from the container 11 by the vacuum system 22 in a short period of time. If by chance the dielectric coated conductor 26 within container 11 becomes contaminated with the gas it may be readily cleared therefrom by connecting one end of conductor 26 through switch 69 to a terminal 72 of a source 73 of heating potential for direct or low frequency current. The other end of the conductor 26 is connected to another terminal 74 of the source 73 so that the aforementioned current will pass through conductor 26, heat it up, and drive off any of the gas which may have been absorbed thereby. The portion of conductor 26 within the container 16 may be made slightly resistive, if desirable, for enhancing the heating thereof during the gaseous decontamination operation.

After the container 11 has been exhausted of the original gas therein as described above, a different gas may be supplied to the container 11 for testing without any undue elapse of time. Analyzation of the microwave absorptive properties of the subsequent gas may then be undertaken as before without fear of false absorption responses on the screen of oscilloscope 66 because of contamination of the walls of container 11 with a previously tested gas.

A microwave absorption cell in accordance with another embodiment of the present invention is illustrated in Fig. 2. Some of the elements of the device in Fig. 2 which are similar in construction and function with elements of the device shown in Fig. 1 are referred to by primed reference numerals. Therefore, a detailed description of such elements need not be repeated.

Referring to Fig. 2, a cylindrical container 76 of dielectric material having low microwave loss properties and low gas contamination properties such as glass is employed for confining the gas to be analyzed. Inlet means comprising aperture 77 is provided at one end of the container 76 for passage of the gas into the container. Means comprising an aperture 78 is provided at the other end of container 76 for coupling to a suitable vacuum system as before.

An intermediate section of a conductor 26' is wound in the form of a helix 79 and supported within the container 76 in coaxial relationship therewith. One end of helix 79 is terminated by a portion of conductor 26' which extends through one end of container 76 in vacuum sealed relationship therewith, the other end of helix 79 being terminated by a portion of conductor 26' which extends through the cylindrical side of container 76 in vacuum sealed relationship therewith near the other end of container 76. The part of conductor 26' within container 76 is coated with a dielectric layer 27' as before for reducing the phase velocity of electromagnetic waves guided therealong.

The dielectric layer 27' about the conductor 26' should be thicker than the layer 27 in the device of Fig. 1, if of the same material, for further decreasing the cross-section of the electromagnetic field about the conductor 26' and permitting relatively close winding of the turns of helix 79. Further dielectric layers 33' and 34' of material similar to that of coating 27' are also provided about portions of the conductor 26' external of the container 76, as in the device of Fig. 1. The dielectric coated conductor 26' comprises a uniconductor surface wave transmission line.

Horn sections 51' and 54' are included with the device of Fig. 2 for providing smooth impedance transitions between the section of uni-conductor transmission line within container 76 and external coaxial transmission line sections and rectangular wave guide sections not shown in Fig. 2. It makes no appreciable difference as far as coupling is concerned whether the horn sections 51' and 54' are coaxial with helix 79 as is horn section 51' or transverse the helix 79 as is horn section 54'. For operation at the same frequencies as the device of Fig. 1, the diameter of the larger ends of horn sections 51' and 54' would not be required to be as large as the corresponding ends of horn sections 51 and 54 of Fig. 1 as the cross-section of the electromagnetic fields about the conductor 26' is reduced more in the device of Fig. 2 than in Fig. 1. This is accounted for because of the fact that thicker layers of dielectric are employed about conductor 26' in Fig. 2 than about conductor 26 in Fig. 1.

In the device of Fig. 2, the pitch of the helix 79 should be wide at the ends of the helix and gradually reduced to a constant value for providing a smooth transition from the linear portions of conductor 26' adjacent the ends of helix 79 to the portion of conductor 26' providing the part of helix 79 having a constant pitch. The constant value of pitch for the helix 79 should be at least one half wavelength to one wavelength at the lowest operating frequency of microwave energy therealong for reducing interaction between the electromagnetic fields about each helical turn. The diameter of helix 79 should be of the order of two wavelengths of larger, the spacing between the cylindrical wall 76 and the turns of the helix 79 being greater than the order of one wavelength at the lowest operating frequency of the device.

The helix 79 is supported within the container 76 by means of three thin low microwave loss dielectric spacer elements of rectangular cross section displaced by approximately 120 degrees from each other about the axis of helix 79. Two of these elements are shown at 81 and 82, for example. Grooves are provided in the inner sides of the aforementioned spacer elements for receiving and supporting the turns of helix 79. The spacer elements are held together at their ends by dielectric rings 83 and 84 cemented thereto and supported by the inner cylindrical wall of container 76.

Shielding means comprising a coating of conductive material 85 such as silver is also provided upon the exterior surface of the dielectric container 76. As in the device of Fig. 1, a Stark modulation voltage can be readily applied between the coating 85 and the conductor 26'.

The microwave absorption cell shown in Fig. 2 could be utilized in a microwave spectrometer system just as the cell shown in Fig. 1. An advantage of the apparatus in Fig. 2 resides in the fact that, for the same degree of interaction of microwave energy with the gas in container 11 in Fig. 1 and container 76 in Fig. 2, the device of Fig. 2 may be considerably shorter than that of Fig. 1. This is evident since in the device of Fig. 2 the electromagnetic waves therein travel along the part of conductor 26' within container 76 along a spiral path whereas in Fig. 1 they travel along conductor 26 within container 11 along a linear path.

A further embodiment of the present invention is shown in Fig. 3. In this embodiment the transmission line for guiding waves through a gas whose microwave absorptive properties are to be analyzed comprises a bare conductor wound in the form of a helix 86 similar to helices employed in traveling wave tubes. The turns of helix 86 are supported by the inner cylindrical wall of a dielectric vacuum container 87 such as glass.

A gas inlet means comprising aperture 88 is provided at one end of the container 87 for the passage of a gas thereinto for analyzation. Aperture means 89 is provided at the other end of container 87 for connection to a suitable vacuum system.

A rectangular input wave guide 90 is coupled to one end of the helix 86 for supplying microwave energy to the helix 86. A rectangular wave guide 91 is coupled to the other end of helix 86 for extracting microwave energy therefrom. The vacuum envelope 87 including end portions of helix 86 pass through central regions of the broad walls of wave guides 90 and 91 in perpendicular relationship thereto.

The wave guides 90 and 91 should be operated in a dominant TE mode wherein the transverse electric vectors of the electromagnetic waves therein are perpendicular to the board walls of wave guides 90 and 91. Therefore, the helix 86 will be excited in a TEM helical mode common to traveling wave tube helices.

The ends of helix 86 are terminated in cylindrical conductive members 92 and 93, respectively. Members 92 and 93 are coaxial with helix 86 and have slanted ends within wave guides 90 and 91 as shown in Fig. 3 for enhancing the coupling between the helix 86 and wave guides 90 and 91 in accordance with principles known in the traveling wave tube art. The other ends of members 92 and 93 extend outward through the broad walls of wave guides 90 and 91 farthest from helix 86.

Cylindrical conductors 94 and 95 are connected to one of the broad walls of wave guide 90 and one of the broad walls of wave guide 91, respectively, so as to be in concentric relationship with the cylindrical members 92 and 93, respectively. Portions of the dielectric container 87 occupy the space between members 92 and 94 and the space between members 93 and 95. The conductors 94 and 95 are dimensioned so that the stub section of coaxial line formed by members 92 and 94 and the stub section of coaxial line formed by members 93 and 95 each have a length of one quarter wavelength of the microwave energy in the dielectric therebetween at the mid-band operating frequency of the apparatus. This is desirable for providing microwave short circuits between cylinders 92 and 93 and the broad walls of wave guides 90 and 91, respectively, through which these cylinders protrude.

The pitch of helix 86 is wide at the ends in the vicinity of wave guides 90 and 91 and narrows down to a value which should be less than the order of one-quarter wavelength at the highest operating frequency of the device. A gradual change in pitch is desirable for enhancing the transition of microwave energy between the wave guides and helix as is known in the traveling wave tube art. The circumference of each helical turn in the section of helix 86 having a constant pitch should be approximately an integral odd number of half wavelengths at the mid-band operating frequency of the device.

Adjustable pistons 96 and 97 are included in wave guides 90 and 91 for further enhancing the transfer of energy from wave guide 90 to helix 86 and from helix 86 to wave guide 91.

A shielding means comprising a conductive cylinder 98 is provided about the helix 86 and container 87 in coaxial relationship therewith between the wave guides 90 and 91. Cylinder 98 should have a diameter of the order of twice the diameter of the helix 86 for minimizing its effect on traveling waves along the helix 86. Cylinder 98 is employed for shielding and for Stark modulation purposes by supplying a Stark modulating voltage between a lead 100 connected thereto via wave guide 90 and a lead 99 connected to the helix 86 via cylindrical conductor 92 at one end of the helix. Lead 99 and also a lead 101 connected to the cylindrical conductor 93 at the other end of helix 86 extend through the ends of container 87 in vacuum sealed relationship therewith, and may be used for heating the helix to drive off any gases which may be absorbed thereby as in the devices of Figs. 1 and 2.

The microwave absorption device shown in Fig. 3 may be utilized in a microwave spectrometer system similar to that shown in Fig. 1. A source of variable frequency microwave energy such as a klystron, not shown, is coupled to the input of wave guide 90, a crystal square-law detector, not shown, being coupled to wave guide 91 at the output end thereof. An advantage of the device of Fig. 3 is that it is especially adaptable for examining the absorption line spectra of gases at low operating frequencies in the neighborhood of 5,000 megacycles. Furthermore, since the turns of helix 86 can be very close together the length of the device in Fig. 3 needs only to be of the order of one-tenth as long as that of Fig. 1 for providing suitable absorption line responses.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A microwave absorption cell, comprising a container of low loss dielectric material including inlet means in a wall thereof for passage into said container of a fluid having microwave absorptive properties, a section of surface wave microwave transmission line comprising a dielectric coated uni-conductor portion supported within said container for guiding electromagnetic waves over a predetermined microwave frequency range along the outer surface of said uni-conductor portion through said fluid at a phase velocity along said axis which is reduced with respect to the velocity of light, means coupled to said uni-conductor portion for launching said electromagnetic waves thereon, metallic means disposed about said container along said uni-conductor portion, said metallic means being radially spaced from the axis of said uni-conductor portion by a sufficient amount so that it has no appreciable effect on electromagnetic wave energy guided by said uni-conductor portion over said microwave frequency range, and means for applying a modulation voltage between said uni-conductor portion and said metallic means for providing an electric field across said container for Stark modulation of said fluid.

2. A microwave absorption cell, comprising container means including a dielectric tubular wall having low gas contamination properties for confining a gas having microwave absorption properties at discrete frequencies, a microwave transmission line comprising a uni-conductor portion supported within said tubular wall for guiding microwave energy over a wide frequency range along the outer surface of said uni-conductor portion in close proximity with and at a phase velocity along the axis of said tubular wall which is reduced with respect to the velocity of light, means coupled to said uni-conductor portion for launching said microwave energy thereon, inlet means in a wall of said container means for the passage of said gas thereinto at a pressure substantially reduced with respect to atmospheric pressure, and metallic means disposed about said tubular wall along said uni-conductor portion, said metallic means being radially spaced from the axis of said uni-conductor portion by a sufficient amount so that it has no appreciable effect on microwave energy guided by said transmission line over said frequency range, and means for applying a modulation voltage between said metallic means and said uni-conductor portion for Stark modulation of said gas.

3. A microwave absorption cell as set forth in claim 2, including a relatively thin layer of dielectric material upon the outer surface of said uni-conductor portion for effecting the reduction in phase velocity of microwave energy guided thereby.

4. A microwave absorption cell as set forth in claim 3, wherein said uni-conductor portion comprises a helix whose pitch is larger than the order of one half wavelength at the lowest frequency of said frequency range.

5. A microwave absorption cell as set forth in claim 2, wherein said uni-conductor portion comprises a helix having a section of constant pitch of less than the order of one quarter wavelength at the highest frequency of said frequency range, the circumference of each turn of said helix being substantially an odd integral multiple including one of a half wavelength at the mid-band frequency of said frequency range.

6. A microwave absorption cell as set forth in claim 2, wherein said uni-conductor portion passes through said tubular wall in vacuum sealed relationship therewith, said uni-conductor portion including a layer of dielectric material disposed upon its surface so as to provide a section of surface wave transmission line.

7. A microwave absorption cell as set forth in claim 6, wherein said uni-conductor extends substantially in a straight line along the axis of said tubular wall.

8. A microwave absorption cell as set forth in claim 6, wherein said uni-conductor portion within said tubular wall is in the form of a helix disposed in coaxial relationship with said tubular wall.

9. A microwave absorption cell, comprising container means including a dielectric tubular wall having low gas contamination properties for confining a gas having microwave absorption properties, a uni-conductor supported within said container means, said uni-conductor being adapted to guide electromagnetic waves over a predetermined frequency range along its outer surface at a phase velocity along the axis of said tubular wall which is reduced with respect to the velocity of light and in close proximity therewith so that most of the power of said electromagnetic waves travels along said uni-conductor without reaching said tubular wall, means coupled to said uni-conductor for launching said electromagnetic waves thereon, inlet means in said tubular wall for the passage of said gas thereinto at a pressure substantially reduced with respect to the pressure of the atmosphere, and electrical shielding means disposed around said tubular wall in insulated relationship with respect to said uni-conductor for establishing a Stark-modulation voltage between said uni-conductor and said shielding means.

10. A microwave absorption cell as set forth in claim 9, wherein a layer of solid dielectric material is disposed about the outer surface of said uni-conductor for effecting the reduction in phase velocity of electromagnetic wave guided thereby.

11. A microwave absorption cell as set forth in claim 10, wherein a portion of said uni-conductor is wound in the form of a helix whose axis is substantially coaxial with the axis of said dielectric tubular wall.

12. A microwave absorption cell as set forth in claim 9, wherein a portion of said uni-conductor comprises a helix for effecting the reduction in axial phase velocity of electromagnetic waves along said uni-conductor, the spacing between the majority of turns of said helix being less than the order of one quarter wavelength at the highest frequency of said predetermined frequency range.

References Cited in the file of this patent

UNITED STATES PATENTS

| | | |
|---|---|---|
| 2,641,702 | Cohen | June 9, 1953 |
| 2,659,860 | Breazeale | Nov. 17, 1953 |
| 2,685,068 | Goubau | July 27, 1954 |
| 2,688,732 | Kock | Sept. 7, 1954 |
| 2,707,231 | Townes | Apr. 26, 1955 |
| 2,738,470 | Norton | Mar. 13, 1956 |
| 2,743,048 | Leck | Apr. 24, 1956 |
| 2,773,245 | Boldstein | Dec. 4, 1956 |